United States Patent
Stockmaster et al.

(10) Patent No.: US 6,933,885 B1
(45) Date of Patent: Aug. 23, 2005

(54) MINIATURIZED DIGITAL GPS ANTI-JAM FOR SPACE AND SIZE CONSTRAINED APPLICATIONS

(75) Inventors: Michael H. Stockmaster, Cedar Rapids, IA (US); Charles E. McDowell, Marion, IA (US); Scott R. Ernst, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/954,841

(22) Filed: Sep. 30, 2004

(51) Int. Cl.$^7$ .............................................. H04B 7/185

(52) U.S. Cl. .................. 342/357.12; 342/16

(58) Field of Search ............................. 342/16, 357.06, 342/357.12; 701/207, 213; 455/63.1, 271

(56) References Cited

U.S. PATENT DOCUMENTS 4,232,373 A * 11/1980 Jackson et al. ................ 702/70
6,480,522 B1 * 11/2002 Hoole et al. ................ 375/130

* cited by examiner

Primary Examiner—Dao Phan
(74) Attorney, Agent, or Firm—Nathan O. Jensen; Kyle Eppele

(57) ABSTRACT

The present invention is a method and apparatus for providing anti-jam protection for GPS receivers. The anti-jam system of the present invention may require less space and less power than conventional anti-jam systems. The anti-jam circuitry of the present invention may provide anti-jam protection while reducing the number of high-power usage components and integrating the components into an overall reduced form factor. Complex signal processing may be avoided whereby hardware manipulations are handled by hardware components rather than a digital signal processor.

21 Claims, 3 Drawing Sheets

MINIATURIZED DIGITAL GPS ANTI-JAM FOR SPACE AND SIZE CONSTRAINED APPLICATIONS

FIELD OF THE INVENTION

This invention relates generally to global positioning system (GPS) applications and more particularly to a method and system of generating anti-jam protection.

BACKGROUND OF THE INVENTION

Global positioning system (GPS) is a constellation of Earth-orbiting satellites. A GPS receiver may analyze high-frequency, low-power radio signals from GPS satellites and employ multiple dimensional trilateration to obtain position, velocity and time information. As a result, GPS recievers may be employed in a variety of applications to aid in navigation and the like. One type of application is the use of GPS receivers in military applications, such as handheld and munitions applications.

A defense to GPS enabled military applications is transmission of a jamming signal. A jamming signal with enough power and suitable temporal and spectral signature causes interference and may deny the use of GPS in a particular area. In response to this threat, GPS receivers employ anti-jamming signal (anti-jam) technology to cancel the interference caused by the jamming signal and aid in reception of GPS signals.

There are several limitations of conventional anti-jam systems. One problem with conventional anti-jam systems is the form factor associated with the implementation. Conventional digital anti-jam systems are not suitable for placement in size constrained applications, such as handheld receivers and munitions applications. Additionally, conventional anti-jam systems require a substantial amount of power.

Referring to FIG. 1, an embodiment of an anti-jam system 100 known to the art is shown. Typically, anti-jam system 100 includes a four element antenna, four channel radio frequency (RF) downconverter 120, an analog to digital converter 130, covariance generation 140, a processor 150 and weight application 160. Processor 150 calculates adaptive weights based on a covariance matrix from covariance generation 140. The covariance matrix refers to a matrix whose elements are the cross-correlations between elements of an antenna. With four elements, a processor is necessary for calculation of the adaptive weights. The processor and four channel RF downconverter 120 require a substantial amount of power. Additionally, the covariance generation 140 and weight application 160 supporting a four channel anti-jam system contribute significantly to hardware complexity.

Consequently, it would be advantageous if an anti-jam system could be manufactured in a form factor for implementation within size-constrained applications and required less power.

SUMMARY OF THE INVENTION

Accordingly, the present invention is directed to a method and apparatus for providing anti-jam protection for GPS receivers. The anti-jam system of the present invention may require less space and less power than conventional anti-jam systems. Advantageously, the anti-jam system may be incorporated with GPS receivers in handheld and munitions applications where size and power considerations are extremely important.

In an embodiment of the invention, anti-jam circuitry of the present invention may provide anti-jam protection while reducing the number of high-power usage components and integrating the components into an overall reduced form factor. In an advantageous aspect of the present invention, complex signal processing may be avoided whereby hardware manipulations are handled by hardware components rather than a digital signal processor.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

Those numerous objects and advantages of the present invention may be better understood by those skilled in the art by reference to the accompanying figures in which.

DETAILED DESCRIPTION OF THE INVENTION

Reference will now be made in detail to presently preferred embodiments of the invention, examples of which are illustrated in the accompanying drawings.

Figure 1:
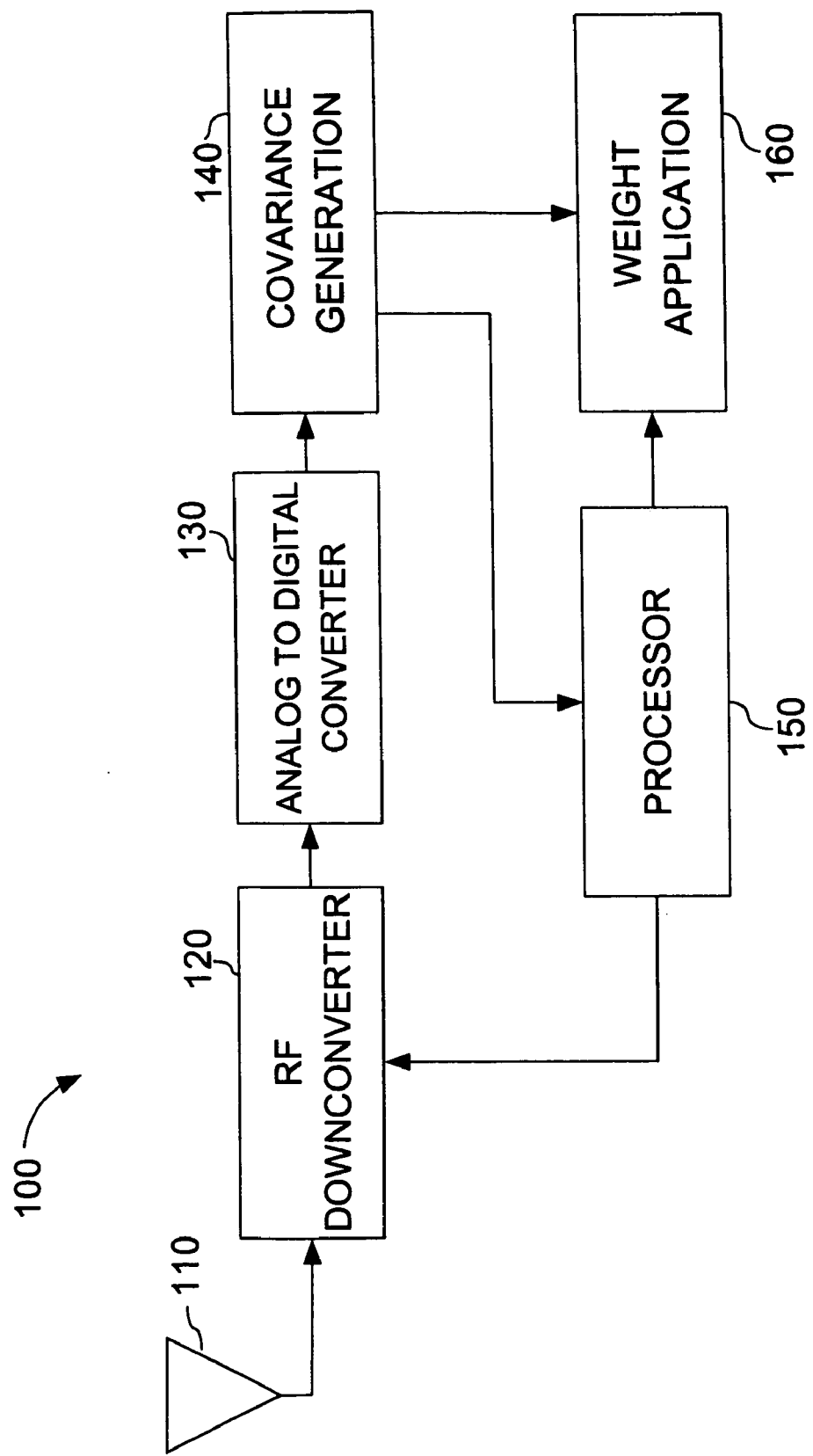
FIG. 1 depicts a block diagram of an anti-jam system known to the art.
Figure 2:
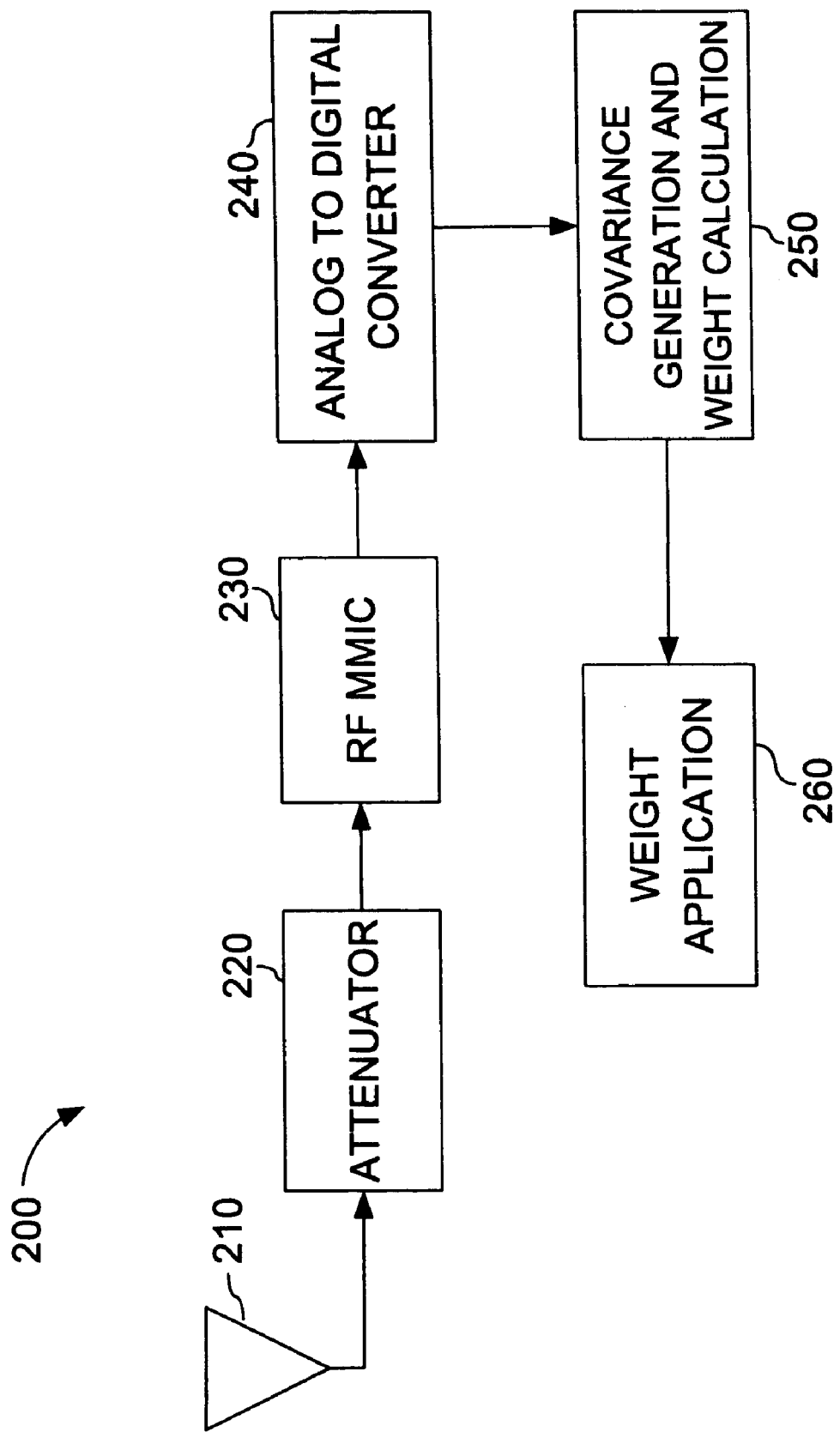
FIG. 2 depicts a block diagram of an embodiment of an anti-jam system in accordance with the present invention.

Referring to FIG. 2, a block diagram of an embodiment of an anti-jam system 200 in accordance with the present invention is shown. Anti-jam system 200 may include an antenna 210, an attenuator 220, a two channel downconverter, an analog to digital converter 240, covariance generation and weight calculation 250 and weight application 260. Attenuator 220 may extend linearity of the received signals of the antenna 210 to provide improved anti-jam performance. The two channel downconverter may receive the signals and output in phase (I) and quadrature (Q) components. The output of the in phase and quadrature components may be advantageous because the requirement of I/Q filters is removed, thus reducing the size and complexity of the anti-jam system 200 of the present invention.

The analog to digital converter 240 may convert the output of the downconverter to digital form. Covariance generation and weight application 250 may produce a covariance matrix of a 2×2 size whereby inversion may only require swapping and negating of elements. Weights may be calculated by weight application 260 and may only require 2 complex multiplies and 1 real multiply. In an embodiment of the invention, two beams may be formed to amplify valid signals from GPS satellites. Advantageously, the anti-jam system 200 of the present invention may simplify conventional anti-jam signal processing by employing hardware manipulations to perform weight calculations and thus may remove the requirement of a processor.

Figure 3:
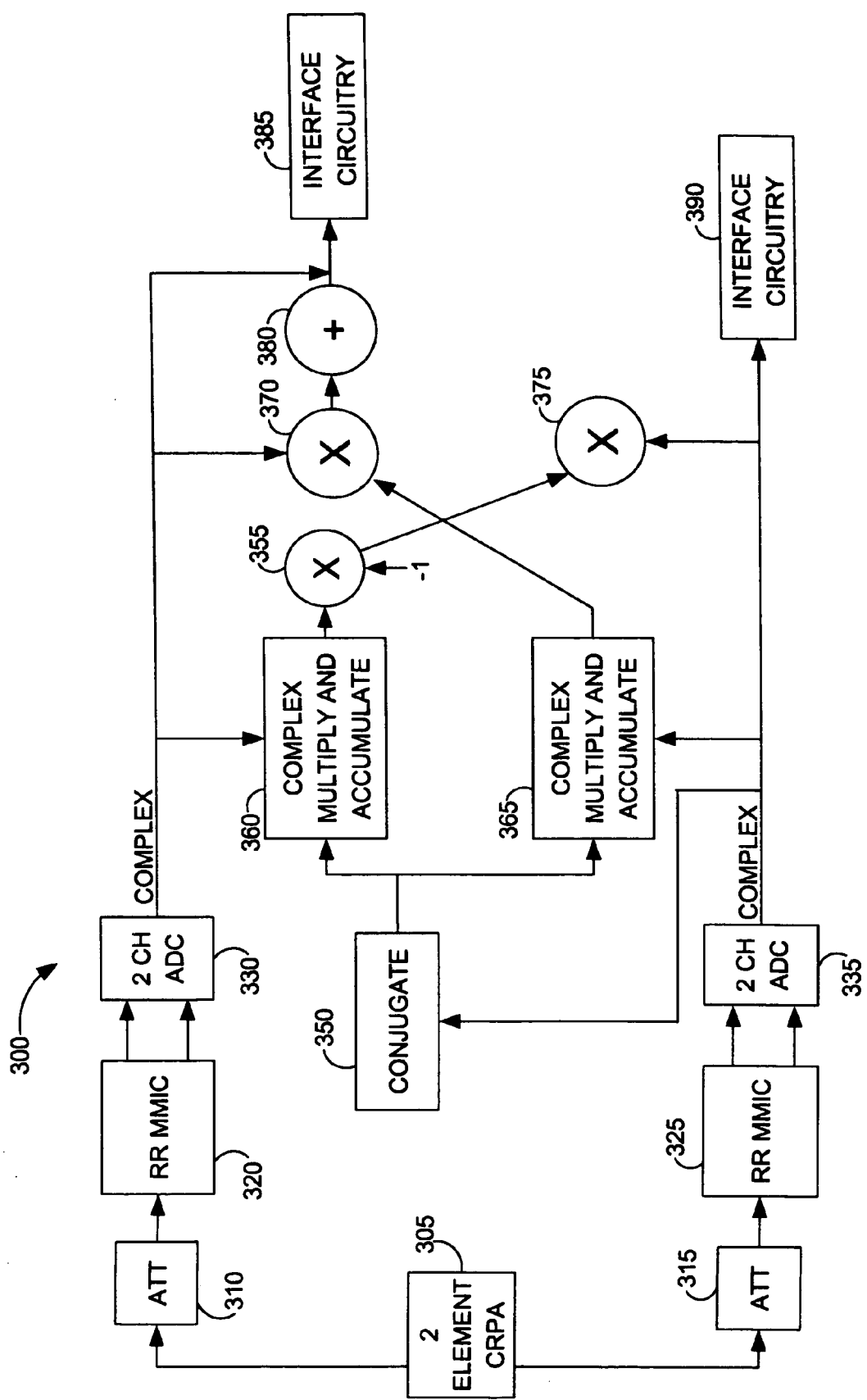
FIG. 3 depicts a detailed diagram of an embodiment of an anti-jam system in accordance with the present invention.

Referring to FIG. 3, a detailed diagram of an embodiment of an anti-jam system 300 in accordance with the present invention is shown. Anti-jam system 300 may be one embodiment of anti-jam system 200 of FIG. 2. Antenna 305 for receiving signals may be a two element controlled radiation pattern antenna. An attenuator 310, 315 may be coupled between the antenna and a radio frequency monolithic microwave integrated circuit 320, 325 (RF MMIC). Attenuator 310, 315 may be placed in front of RF MMIC 320, 325 and may provide attenuation to extend the linearity for improved anti-jam signal performance. It is contemplated that anti-jam system 300 may not include an attenuator by those with ordinary skill in the art without departing from the scope and intent of the present invention.

Advantageously, the RF MMIC 320, 325 may produce in phase and quadrature components without the necessity of I/Q filters. Additionally, MMICs occupy less space and are less expensive than conventional downconverters employed in anti-jam systems. Furthermore, MMICs are typically employed in GPS receivers. In an embodiment of the invention, the existing MMICs employed in GPS receivers may operate with the anti-jam system 300 to suppress jamming signals for the GPS receiver.

Analog to digital converters 330, 335 may receive the in phase and quadrature components of the RF MMIC 320, 325. Analog to digital converters 330, 335 may be two channel analog to digital converters. The output of the two channel analog to digital converters may be complex.

In an embodiment of the invention, the anti-jam system, the calculation of the weights may be determined as shown below:

$$w = R_{xx}^{-1} * r_{xd}$$

where w refers to the calculation of the weight, $R_{xx}^{-1}$ refers to the covariance matrix and $r_{xd}$ refers to the cross correlation vector. Advantageously, the covariance matrix of the anti-jam system 300 of the present invention may be a 2×2 size, as shown below:

$$R_{xx}^{-1} = \begin{bmatrix} c_1 c_1^* & c_1 c_2^* \\ c_1^* c_2 & c_2 c_2^* \end{bmatrix}^{-1} \sim \begin{bmatrix} c_2 c_2^* & -c_1 c_2^* \\ -c_1^* c_2 & c_1 c_1^* \end{bmatrix}$$

where $c_1$ is a first channel complex data and $c_2$ is a second channel complex data, * referring to the complex conjugate. Additionally, the cross correlation vector $r_{xd}$ may be of the anti-jam system 300 may be [1;0], thus, the matrix multiplication of the covariance inverse may be represented by:

$$w \sim \begin{bmatrix} c_2 c_2^* \\ -c_1^* c_2 \end{bmatrix}$$

Generation of the covariance matrix by the anti-jam system 300 may be performed by the conjugation 350 of the first channel complex data and the accompanying multiply and accumulate with the first channel data and second channel data respectively. Advantageously, the complex weights are inherently calculated by the covariance processing. The weight to be applied to the first channel is the output of the complex multiply and accumulate block (covariance element) 365 and the weight to be applied to the second channel is the output of complex multiply and accumulate block (covariance element) 360 after negation 355. Application of the weights may be achieved via multipliers 370, 375 and summer 380 whereby the anti-jam suppression may be produced. Interface circuitry 385, 390 may provide the interface to a GPS receiver. In an embodiment of the invention, interface circuitry 385 may refer to the null output and interface circuitry 390 may refer to the pass-through output. Additionally, interface circuitry 385, 390 may provide an interface for the conversion of a higher resolution signal to a lower resolution signal, the lower resolution signal being suitable for a GPS receiver.

In an embodiment of the invention, anti-jam system 300 of the present invention may provide as much as 30 dB of anti-jam protection. However, it is contemplated that differing quantities of anti-jam protection may be provided by those with ordinary skill in the art through employment of different quality components without departing from the scope and intent of the present invention. Additionally, the resolution of anti-jam system 300 may be reduced as low as 6 bits. Advantageously, reduced resolution may provide significant size, power and cost savings.

In another advantageous aspect of the invention, anti-jam system 200 and anti-jam system 300 of FIGS. 2–3 may allow integration with GPS receivers and SAASM enabled GPS receivers. SAASM refers to the selective availability/antispoofing modules of the United States Air Force Joint Program Office. SAASM-based products may acquire the Y-code of a GPS signal directly in a 10–20 dB anti-jam margin with direct Y code acquisition. Due to the reduced form factor of the components of anti-jam system 200 and 300 of FIGS. 2–3, anti-jam systems 200 and 300 may be integrated with a GPS receiver chip, or alternatively a SAASM enabled GPS receiver chip. Advantageously, GPS receiver chips may be fabricated with anti-jam systems 200, 300 whereby anti-jam protection is implemented with minimal size and power constraints.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for providing anti-jam protection, comprising:
   a two element antenna;
   a radio frequency downconverter providing an in phase and quadrature component of received signals by the two element antenna; and
   at least two analog to digital converters coupled to said radio frequency downconverter, wherein a first channel complex data and a second channel complex data formed from an output of each of said at least two analog to digital converters form a covariance matrix, a weight calculation obtained from said covariance matrix providing optimal anti-jam suppression, the calculated weight for optimal anti-jam suppression being applied through hardware components.

2. The system as claimed in claim 1, wherein said two element antenna is a controlled radiation pattern antenna.

3. The system as claimed in claim 1, wherein said radio frequency downconverter is a monolithic microwave integrated circuit.

4. The system as claimed in claim 1, wherein said in phase and quadrature components are received by said analog to digital converter.

5. The system as claimed in claim 1, wherein said covariance matrix is formed through conjugation of said first channel complex data along with multiplication and accumulation of the first channel complex data and second channel complex data.

6. The system as claimed in claim 1, wherein said hardware components include two multipliers and a summer.

7. The system as claimed in claim 1, further comprising an attenuator.

8. The system as claimed in claim 7, wherein said attenuator is coupled to said antenna and said radio frequency downconverter.

9. The system as claimed in claim 1, further comprising an interface suitable for receipt of an output of the anti-jam system by a global positioning system receiver.

10. A system for providing anti-jam protection, comprising:
   a two element antenna;
   a monolithic microwave integrated circuit providing an in phase and quadrature component of received signals by the two element antenna; and
   at least two analog to digital converters coupled to said monolithic microwave integrated circuit, wherein a first channel complex data and a second channel complex data formed from an output of each of said at least two analog to digital converters form a covariance matrix, a weight calculation obtained from said covariance matrix providing optimal anti-jam suppression, the calculated weight for optimal anti-jam suppression being applied through hardware components.

11. The system as claimed in claim 10, wherein said two element antenna is a controlled radiation pattern antenna.

12. The system as claimed in claim 10, wherein said in phase and quadrature components are received by said analog to digital converter.

13. The system as claimed in claim 10, wherein said covariance matrix is formed through conjugation of said first channel complex data along with multiplication and accumulation of the first channel complex data and second channel complex data.

14. The system as claimed in claim 10, wherein said hardware components include two multipliers and a summer.

15. The system as claimed in claim 10, further comprising an attenuator.

16. The system as claimed in claim 15, wherein said attenuator is coupled to said two element antenna and said monolithic microwave integrated circuit.

17. The system as claimed in claim 10, further comprising an interface suitable for receipt of an output of the anti-jam system by a global positioning system receiver.

18. A system for providing anti-jam protection, comprising:
   a two element antenna;
   a first and second attenuator coupled to said two element controlled radiation antenna;
   a monolithic microwave integrated circuit coupled to each of said first and second attenuators, said monolithic microwave integrated circuit provides in phase and quadrature components;
   an analog to digital converter coupled to each monolithic microwave integrated circuits;
   a first multiplier;
   a second multiplier; and
   a summer, wherein a first channel complex data and a second channel complex data formed from an output of each analog to digital converter form a covariance matrix, a weight calculation obtained from said covariance matrix providing optimal anti-jam suppression, the first multiplier, second multiplier and summer applying the calculated weight for optimal anti-jam suppression.

19. The system as claimed in claim 18, wherein said two element antenna is a controlled radiation pattern antenna.

20. The system as claimed in claim 18, wherein said covariance matrix is formed through conjugation of said first channel complex data along with multiplication and accumulation of the first channel complex data and second channel complex data.

21. The system as claimed in claim 18, further comprising an interface suitable for receipt of an output of the anti-jam system by a global positioning system receiver.

* * * * *